April 26, 1938.     H. BREGMAN     2,115,609
VEHICLE
Filed March 25, 1936
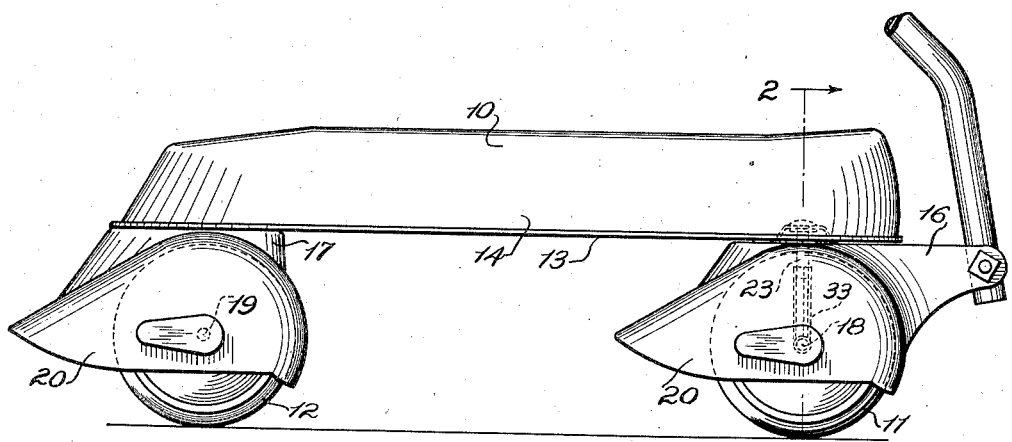
Fig. 1
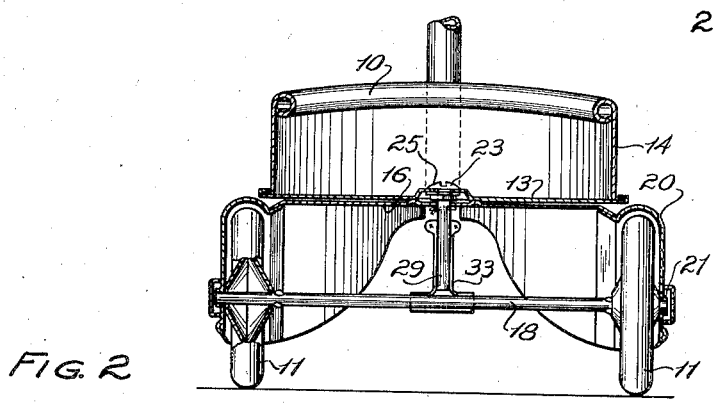
Fig. 2
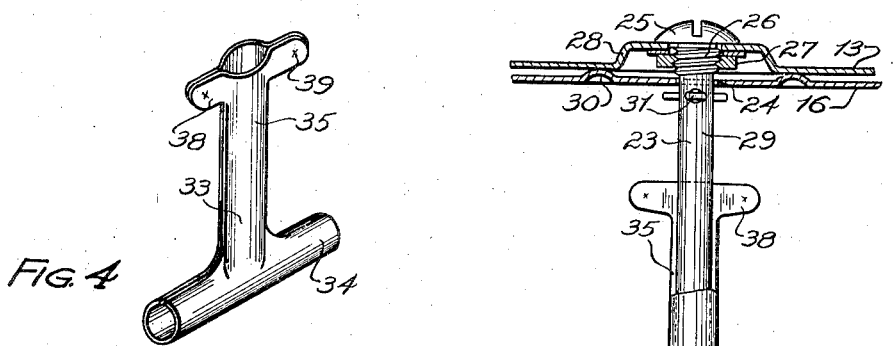
Fig. 4
Fig. 3
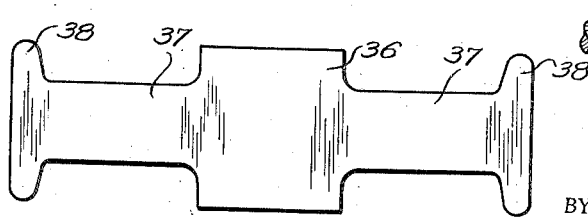
Fig. 5
INVENTOR.
HARRY BREGMAN
BY Kwis, Hudson & Kent
ATTORNEYS.

Patented Apr. 26, 1938

2,115,609

UNITED STATES PATENT OFFICE 2,115,609

VEHICLE

Harry Bregman, Lorain, Ohio, assignor to The Steel Stamping Company, Lorain, Ohio, a corporation of Ohio Application March 25, 1936, Serial No. 70,847

1 Claim. (Cl. 280—87.01)

This invention relates to an improved construction for wheeled vehicles and more particularly to a novel construction for connecting a pair of wheels or a wheeled truck with a body member of the vehicle.

An object of this invention is to provide an improved construction for vehicles, particularly toy vehicles, wherein novel connecting means of simplified form and increased strength is utilized to connect a pair of wheels with a body member of the vehicle.

Another object of this invention is to provide an improved vehicle construction wherein the connection between a body member of the vehicle and the wheels includes bracing means comprising cooperating parts in telescoping relation and connected respectively with the body member and the axle upon which the wheels are mounted.

A further object of this invention is to provide an improved pivotal connection between a body member of a vehicle and one pair of wheels thereof, comprising a part connected with the axle and extending angularly therefrom and a pivot member extending from the body member and engaging such part.

Still another object of this invention is to provide novel and economically constructed bracing means for a toy vehicle having an axle and a pivot pin, such bracing means comprising a sheet metal member having hollow portions adapted for engagement respectively with the axle and pivot pin.

Other objects and advantages of the invention will be apparent from the following description when taken in connection with the accompanying sheet of drawings wherein Fig. 1 is a side elevation of a vehicle embodying my invention.

Fig. 2 is a transverse sectional view taken on the line 2—2 of Fig. 1.

Fig. 3 is a partial transverse sectional view similar to Fig. 2, but showing my novel connection and bracing means on a larger scale.

Fig. 4 is a perspective view showing one member of my novel connection in detached relation, and Fig. 5 is a developed plan view showing a blank from which the member of Fig. 4 may be formed.

In the accompanying drawing I have shown a novel form of connection and bracing means adapted to be embodied in wheeled vehicles, and which is especially useful in simplifying and strengthening the construction of toy vehicles.

In disclosing my invention detailed reference will be made to the particular construction and type of vehicle illustrated in the accompanying drawing, but it should be understood that the drawing is illustrative only and that the invention may be embodied in other vehicles and in other specific forms of construction.

Since my invention is especially useful in simplifying and strengthening the construction of toy vehicles, I have therefore in this instance shown the invention as being embodied in a toy vehicle, namely a child's wagon. As shown in the drawing the wagon may be provided with a body member 10, preferably though not necessarily of sheet metal construction, and with pairs of front and rear wheels 11 and 12. The body member 10 may be of different forms of construction, for example it may, as shown in this instance, be provided with a bottom 13 and with an upstanding side wall 14 which is connected with the bottom around the outer edge thereof.

The front and rear ends of the body member 10 may be supported, respectively, upon frame members or truck members 16 and 17 which are, in turn, supported by front and rear axles 18 and 19. The front and rear wheels 11 and 12 are mounted respectively for rotation on the axles 18 and 19. The frame members 16 and 17 may be formed of sheet metal and may be constructed in the form of a stream-lined hood which partially conceals the axles and includes fenders 20 partially concealing the wheels. The frame member 17 may have a permanent or immovable connection with the body member 10, but the frame member 16 preferably has a pivotal connection with the body member permitting swinging of the front wheels for steering purposes. The axles 18 and 19 may be mounted in their respective frame members 16 and 17 by having the ends of the axles extend into bearings 21 formed on the fenders 20.

The connection between the body member 10 and the front wheels 11 embodies the novel connecting and bracing means of my invention, and as best shown in Figs. 2 and 3 of the drawing, this connection may include a pivot pin 23 which extends through the bottom of the body member and through an opening 24 provided in the frame member 16. The pivot pin 23 may be connected with the bottom 13 by providing the pin with a head 25 and with a relatively short threaded section 26 which is engaged by a nut 27 for clamping a portion of the bottom against the head of the pin. The bottom 13 may have a raised portion 28 providing a recess in the back thereof to accommodate the clamping nut 27. A portion of the pivot pin 23 extending beyond the threaded section 26 may be in the form of a plain cylindrical stem 29 which extends through the opening 24 of the frame member 16. If desired, the frame member 16 may be provided with a raised annular bead 30 which extends around the opening 24 and forms a bearing element which is engaged by the bottom 13. The bead 30 and the bottom 13 of the body member may be retained in cooperating relation with each other by providing the stem portion 29 of the pivot pin with a transverse retaining pin 31.

I incorporate in the connection just described a novel bracing means which is formed by the pivot pin extension or stem portion 29 and a member 33 connected with the axle 18. The member 33 may have a generally T-like shape, including a portion 34 which is connected with or extends around the axle 18 and a sleeve portion 35 which extends outwardly from the axle substantially at right angles and has telescoping engagement with the stem portion 29 of the pivot pin. The opening of the sleeve portion 35 is preferably of such size that the stem portion 29 has a snug sliding fit therein. The member 33 may be of any suitable form of construction, but I find that this member can be very economically produced from a sheet metal blank of substantially the shape shown in Fig. 5. This member can be produced from a blank of this general shape by suitable forming operations including doubling the metal so that the intermediate portion 36 of the blank forms the hollow part 34 which engages the axle 18 and the oppositely extending arms 37 from opposing complemental sections or halves of the sleeve portion 35. The complemental sections of the sleeve portion 35 may be prevented from springing away from each other by providing the same with pairs of ears 38 which may be connected together by spot welding indicated at 39 or by any other suitable means.

In assembling the parts of the vehicle illustrated in this instance, the bracing and connecting member 33 is mounted on the axle 18 and when the body member 14 is to be connected with the frame member 16 the stem portion 29 of the pivot pin 23 is passed through the opening 24 and inserted into the sleeve portion 35. The retaining pin 31 is then inserted through an opening of the pivot pin to prevent the latter from being withdrawn from the opening 24 and the sleeve 35.

From the construction and arrangement just described, it will be seen that the member 33 cooperates with the extension stem 29 of the pivot pin to prevent relative forward and backward rocking between the axle 18 and the body member 14. The member 33 thus provides a connection between the pivot pin and the front axle which greatly strengthens the construction of the vehicle at this point and avoids the need for various troublesome and unattractive bracing arrangements which have been used heretofore. It will thus be readily seen that the connecting and bracing means which I have provided affords a simplified and more economical construction and contributes to the neat and attractive appearance of the vehicle.

While I have illustrated and described the novel vehicle structure of my invention in a more or less detailed manner, it will be understood of course that I do not wish to be limited to the precise arrangements and details of construction illustrated and described, but regard my invention as including such changes and modifications as do not constitute a departure from the spirit of the invention and the scope of the appended claim.

Having thus described my invention, I claim:

In a toy vehicle having a truck provided with an axle and wheels and adapted to swing about a pivot pin, bracing means comprising a member of substantially inverted T-shape formed from a single piece of sheet metal and having an elongated sleeve portion corresponding with the bar of the T and surrounding the axle and a second elongated sleeve portion corresponding with the stem of the T and extending at substantially right angles from an intermediate point of the first mentioned sleeve and telescoping said pivot pin.

HARRY BREGMAN.